Jan. 28, 1969   J. W. TEAL   3,423,916
GRASS CATCHER ATTACHMENT FOR LAWN MOWERS
Filed June 22, 1965   Sheet 1 of 2

John W. Teal
INVENTOR.

BY Clarence A. O'Brien
and Harvey B. Jacobson
Attorneys

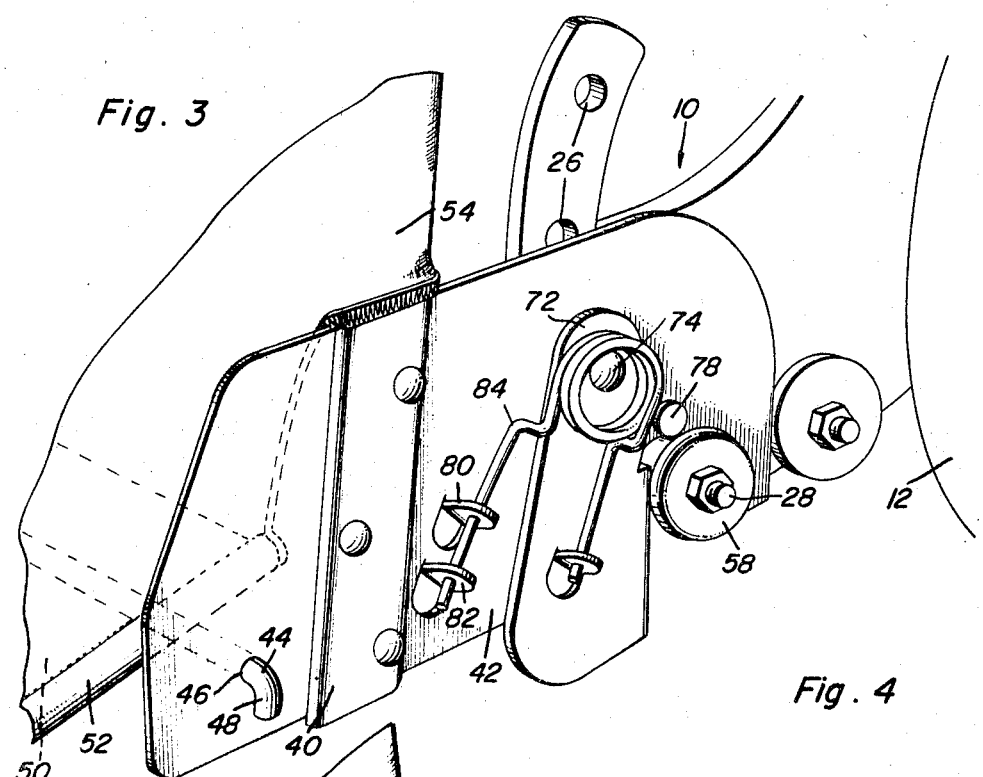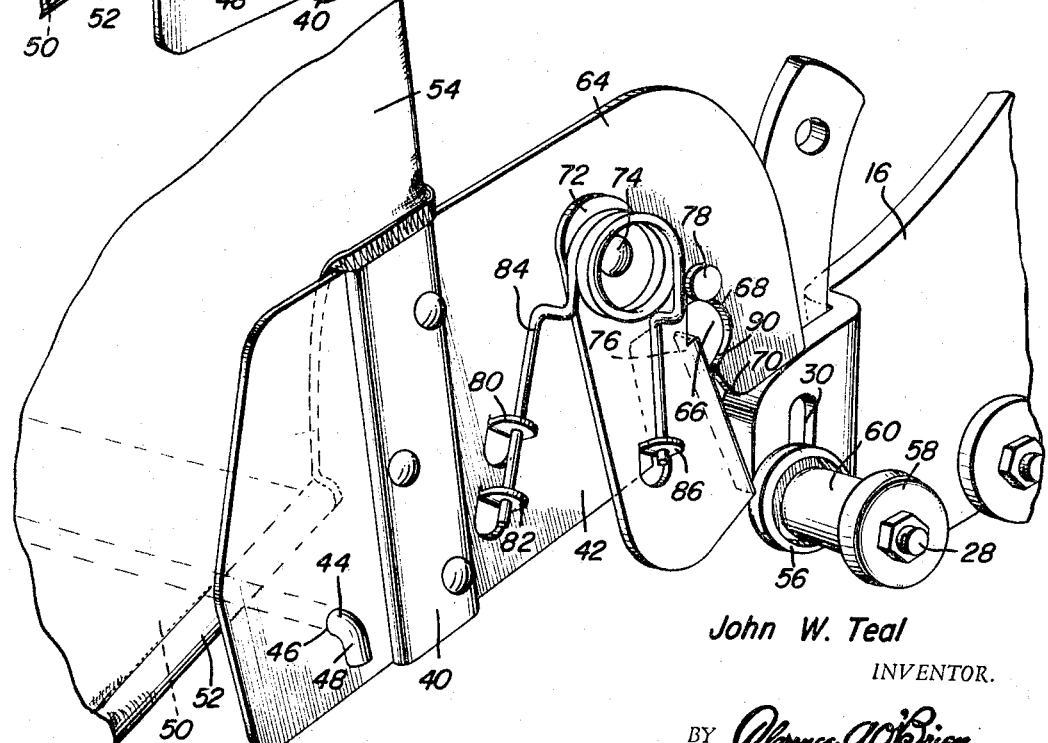

United States Patent Office 3,423,916
Patented Jan. 28, 1969

3,423,916
GRASS CATCHER ATTACHMENT FOR LAWN MOWERS
John W. Teal, Goleta, Calif.
(P.O. Box 984, Santa Barbara, Calif. 93102)
Filed June 22, 1965, Ser. No. 465,847
U.S. Cl. 56—199
Int. Cl. A01d 43/06
3 Claims

ABSTRACT OF THE DISCLOSURE

A lawn mower with an attached grass catcher removable from engagement with the lawn mower upon forward and upward movement of the front end of the grass catcher relative to the lawn mower and engageable with the lawn mower upon forward and subsequent downward shifting of the forward end of the grass catcher relative to the lawn mower after initial positioning of the grass catcher immediately to the rear of the lawn mower.

---

This invention relates to a novel and useful grass catcher attachment for lawn mowers and more specifically to a grass catching attachment designed primarily for use with reel-type lawn mowers.

The grass catcher attachment of the instant invention is conventional in its general configuration in that it defines a forwardly and upwardly opening cut grass receptacle which is adapted to be secured to a reel-type lawn mower with its forward edge portion disposed immediately rearwardly of the conventional ground roller of an associated reel-type lawn mower.

However, the grass catcher attachment of the instant invention is adapted to be secured to an associated lawn mower in a manner such that it may be readily disconnected from the lawn mower for emptying purposes and thereafter again mounted on the lawn mower with little effort.

Most conventional grass catcher attachments for reel-type lawn mowers include mounting means adapted for securement to the associated reel-type lawn mower which require that the rear end portion of the cut grass receptacle be first lifted before the grass catcher can be removed from engagement with the associated lawn mower. With this type of motion necessary to remove the conventional grass catcher attachments from associated lawn mowers, a problem exists in that lifting the rear portion of the cut grass receptacle results in at least a portion of the cut grass within the receptacle being dumped out of the front end of the receptacle before it can be completely disengaged from the associated reel-type lawn mower. This of course is an annoying problem in that the spilled cut grass must then be picked up by hand and placed within the detached conventional cut grass receptacle before the latter is carried to a dumping point.

Furthermore, conventional grass cutters often include means suspending the rear portion of the cut grass receptacle defined thereby from an upper portion above the handle of the associated reel-type lawn mower. This type of mounting of a conventional grass catcher attachment can also result in a portion of the load of cut grass within the receptacle being dumped from the forward end thereof during operation of the associated reel-type lawn mower, this inadvertent dumping of the cut grass from the grass catcher sometimes occurring when it becomes necessary, during normal operation of the associated reel-type lawn mower, to raise the handle of the lawn mower above its lower limit position thereby elevating the rear end of the grass catcher.

It is the main object of this invention to provide a grass catcher attachment for reel-type lawn mowers constructed in a manner whereby it may be readily disengaged from the associated reel-type mower by a forward and upward pull on the forward end of the forwardly and upwardly opening front end portion of the grass catcher attachment.

It is a further object of this invention to provide a grass catcher attachment which may be, after being dumped, readily re-engaged with the associated reel-type lawn mower with a minimum amount of effort.

Still another object of this invention is to provide a grass catcher attachment in accordance with the preceding objects and which does not include means suspending the rear portion of the forwardly and upwardly opening cut grass receptacle defined thereby from the rear upper portion of the associated lawn mower handle.

A further object of this invention is to provide a grass catcher attachment in accordance with the preceding objects including means by which the grass catcher may be readily removably engaged with the associated reel-type lawn mower in a manner such that any normal operation of the associated reel-type lawn mower will not result in inadvertent disengagement of the grass catcher from the lawn mower.

A final object of this invention to be specifically enumerated herein is to provide a grass catcher attachment for lawn mowers in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
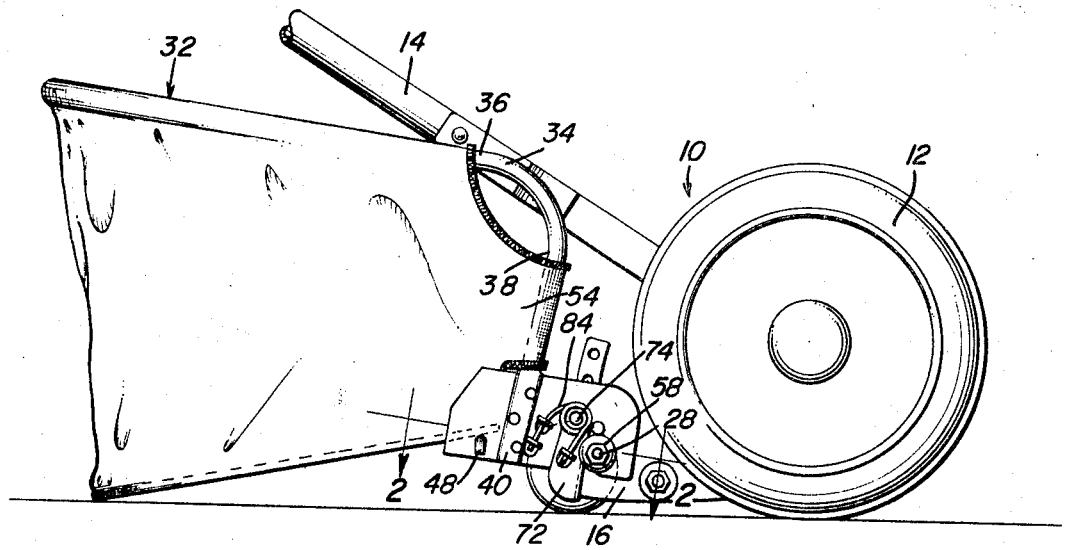
FIGURE 1 is a fragmentary side elevational view of a conventional form of reel-type mower shown with the grass catcher attachment of the instant invention mounted thereon.
Figure 2:
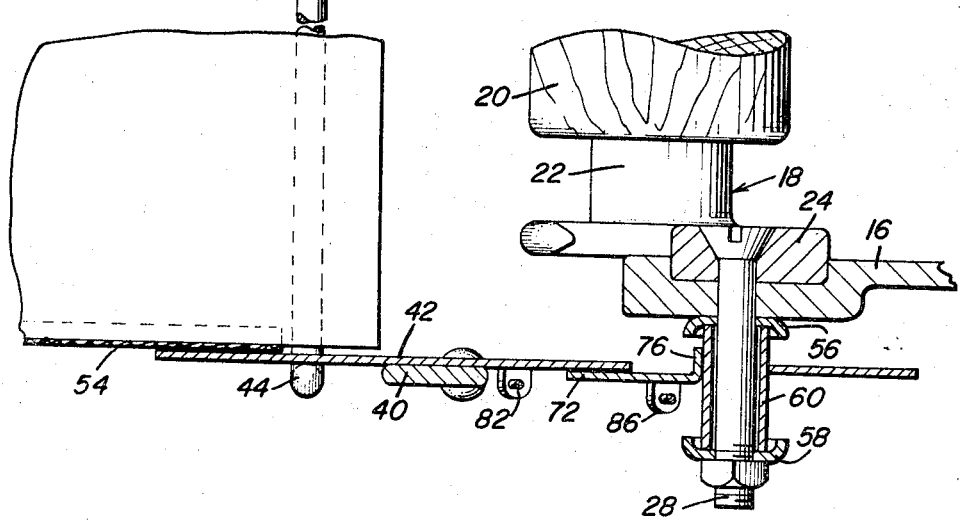
FIGURE 2 is an enlarged fragmentary horizontal sectional view taken substantially upon the plane indicated by the section line 2—2 of FIGURE 1.

FIGURE 3 is a fragmentary perspective view of the lawn mower and grass catcher attachment on somewhat of an enlarged scale more clearly illustrating the manner in which the grass catcher attachment may be mounted in operative position on the associated reel-type mower; and FIGURE 4 is a fragmentary enlarged perspective view similar to that of FIGURE 3 but showing the grass catcher attachment detached from the lawn mower.

Referring now more specifically to the drawings the numeral 10 generally designates a conventional form of lawn mower of the reel-type including ground engaging wheel means 12 and a rearwardly and upwardly projecting handle 14. In addition, the lawn mower 10 includes rearwardly projecting opposite side frame means 16 from which a vertically adjustable ground roller assembly generally referred to by the reference numeral 18 is supported.

Th roller assembly 18 includes an elongated horizontally disposed and transversely extending roller 20 whose opposite end portions are journaled from stub axle portions 22 carried by slides 24 which are arcuate in configuration and apertured at points spaced longitudinally therealong as at 26. A suitable bolt type fastener 28 is secured through a selected aperture 26 and slidably received in a vertically extending slot 30 formed in the corresponding frame portion 16.

Although not illustrated, it is to be understood that the lawn mower 10 includes a pair of wheels 12 and that the roller assembly 18 extends between a pair of opposite side frame portions 16 with the mounting of the roller assembly 18 being substantially the same at its opposite ends.

The grass catcher attachment of the instant invention is generally referred to by the reference numeral 32 and includes a tubular supporting frame 34 including a pair of longitudinally extending upper opposite side portions 36 interconnected at their rear ends by means of an integral bight portion (not shown) and which terminate at their forward ends in downturned upright end portions 38. The lower terminal end portions of the downturned end portions 38 are flattened as at 40 and secured to a pair of right and left hand mounting brackets 42. An elongated and transversely extending support bar 44 extends between the rear ends of the mounting brackets 42 and has its opposite ends passed through corresponding apertures 46 formed in the mounting plates or brackets 42. One free terminal end portion of the support rod 44 has a cotter key 47 secured therethrough and the other end is downturned as at 48.

A sheet metal bottom 50 is provided for the grass catcher attachment 32 and includes rolled opposite side and rear edge portions 52 over which the lower edges of a panel of fabric 54 are secured. The upper edges of the panel 54 are secured to the upper opposite side members 36 and the connecting bight portion (not shown) and the forward edge portions of the panel 54 are secured to the downturned end portions 38. Thus, it may be seen that the grass catcher attachment 32 defines a forwardly and upwardly opening cut grass receptacle.

The bolt type fastener 28 comprises a part of the attachment 32 and replaces a conventional shorter bolt type fastener. Each bolt type fastener 28 includes an outwardly cupped inner washer 56 and an inwardly cupped outer washer 58 as well as a spacer sleeve 60 disposed between the confronting washers 56 and 58. The sleeves 60 define generally horizontal and transversely extending opposite side mounting members which are adapted to be engaged by the mounting brackets 42 in order to removably secure the grass catcher attachment 32 to the lawn mower 10.

The forward end portions of the brackets 42 define upstanding plate-like portions 64 and each plate-like section 64 includes a downwardly opening recess 66 including a forwardly bulging upper end portion 68 which opens rearwardly. In addition, the portions of the brackets 42 which define the forwardmost extremities of the lower ends of the recesses 66 define forwardly and downwardly inclined surfaces 70. A pair of upstanding level arms 72 have their upper ends pivotally secured to corresponding mounting brackets 42 in any convenient manner such as by pivot fasteners 74 and their lower ends project below the lower ends of the recesses 66 and include laterally directed abutment flange portions 76 which oppose the forwardly and downwardly inclined surfaces 70.

A stop pin 78 is carried by each mounting bracket 42 and is engageable by an upper portion of the corresponding lever arm 72 to limit forward swinging movement of the lower end of the corresponding lever arm 72 to the positions illustrated in FIGURES 1 and 3 of the drawings. In these positions, it may be seen that the forward surfaces of the laterally directed flange portions 76 and the forwardly and downwardly inclined edges 70 define downwardly flared throats in which the corresponding sleeves 60 are receivable.

A pair of apertured laterally struck portions 80 and 82 anchor one end of a coil spring 84 while the other end of the coil spring is anchored in an apertured laterally struck portion 86 of the corresponding lever arm 72. The coil springs 84 yieldingly urge the lower end portions of the corresponding lever arms 72 forwardly to the limit position illustrated in FIGURE 4 of the drawings. As previously stated, the sleeves 60 are receivable in the downwardly flared throats defined between the laterally directed flange portions 76 and the edges 70 when the lever arms 72 are in the position illustrated in FIGURE 4 of the drawings. Thus, downward movement of the mounting brackets 42 toward the sleeve portions 60 will engage sleeve portions 60 with the lower end portions of the lever arms 72 in order to pivot the lever arms 72 rearwardly so as to provide clearance for the sleeves 60 to be received in the upper end portions of the recesses 66. Then, forward swinging movement of the lever arms 72 will cam the sleeves 60 into the forwardly bulging portions 68 of the recesses 66 in order to secure the grass catcher attachment 32 to the lawn mower 10.

When it is desired to remove the grass catcher attachment 32 from the lawn mower 10, it is merely necessary to grip the forward end of the grass catcher 32 in order to raise the latter, which action will cause the lever arms 72 to pivot rearwardly at their lower ends in order to provide clearance for the sleeves 60 to pass outwardly of the throats defined between the laterally directed flange portions 76 and the edges 70.

With attention invited now more particularly to FIGURE 4 of the drawings, it may be seen that the lower extremities of the forwardly bulging portions 68 of the recesses 66 are defined by rearwardly and downwardly inclined edges 90 of the mounting brackets 42. Thus, a forward and upward pull on the attachment 32 is all that is required to remove the attachment 32 from engagement with the lawn mower 10. By this action, any cut grass within the receptacle defined by the grass catcher 32 will be retained within the latter preventing cut grass from falling out of the forward end of the grass catcher 32. In addition, no rear portion of the grass catcher 32 is suspended from an upper portion of the handle 14 and therefore raising the handle 14 does not result in the rear end of the grass catcher 32 being raised which might also cause grass cuttings to be dumped from the forward end of the grass catcher attachment 32.

What is claimed as new is as follows:

1. In combination, a reel-type lawn mower of the type including a pair of generally horizontal and elongated transversely extending opposite side mounting members, a grass catcher attachment including frame means and defining a forwardly and upwardly opening cut grass receptacle, opposite side portions of said frame means being disposed adjacent the front end of said receptacle and including upstanding plate-like mounting brackets extending in front to rear directions relative to said receptacle and having upstanding downwardly opening recesses formed therein upwardly into which said mounting members are receivable when said mounting brackets are downwardly advanced toward said mounting members, said recesses including forwardly bulging and rearwardly opening upper end portions in which said mounting members are receivable and are adapted to be seated, lever members pivotally supported from said mounting brackets for oscillation about axes extending transversely of said brackets and lever members and including portions thereof swingable between first forward limit positions extending along said recesses and at least partially registered with and defining abutments at least partially blocking said recesses for preventing passage of said mounting members from said forwardly bulging portions into and downwardly through said recesses and second rearwardly displaced positions unblocking said recesses for ready movement of said mounting members rearward from said forwardly bulging portions into and down through said recesses, means yieldingly urging said lever members toward said first positions, said lever members including lower free end portions projecting below the marginal edge portions of said mounting brackets adjacent the lower open ends of said recesses and engageable with said mounting members upon forward shifting of said catcher relative to said lawn mower for rearward displacement of said free end portions relative to said receptacle so as to sufficiently uncover said recesses for receiving said mounting members therein, whereby when said mounting members are registered with the lower ends of said recesses said receptacle may be lowered relative to said mower to pass said mounting members upwardly through said recesses and into said forwardly bulging portions of said recesses.

2. The combination of claim 1 wherein the portions of said brackets defining the lower limits of the forwardly bulging portions of said recesses are rearwardly and downwardly inclined whereby the grass catcher attachment is adapted to have its front end pulled forwardly and upwardly for its removal from engagement with said mounting members.

3. The combination of claim 1 wherein the axes of rotation of said lever arms are spaced above the upper ends of said recesses.

References Cited

UNITED STATES PATENTS

| | | | |
|---|---|---|---|
| 678,461 | 7/1901 | Egan | 56—198 |
| 877,299 | 1/1908 | Curran | 56—199 |
| 1,786,314 | 12/1930 | Passmel | 24—201.4 X |
| 2,124,835 | 7/1938 | Strutz | 24—235 |
| 2,191,601 | 2/1940 | Wessock | 56—199 X |

FOREIGN PATENTS 274,304  7/1927  Great Britain.

ABRAHAM G. STONE, *Primary Examiner.*

PASQUALE A. RAZZANO, *Assistant Examiner.*